No. 625,170. Patented May 16, 1899.
J. T. KEARNS.
CAN FILLING MACHINE.
(Application filed Dec. 3, 1898.)

(No Model.) 2 Sheets—Sheet 1.

Witnesses
A. J. Colbourne.
H. H. G. Ardagh.

Inventor
J. T. Kearns.
by Ridout & Maybee
attys

No. 625,170. Patented May 16, 1899.
J. T. KEARNS.
CAN FILLING MACHINE.
(Application filed Dec. 3, 1898.)
(No Model.) 2 Sheets—Sheet 2.

Witnesses
a. J. Colbourne
H. H. G. Ardagh

Inventor
J. T. Kearns
by Ridout & Maybee
Attys

UNITED STATES PATENT OFFICE.

JAMES THOMAS KEARNS, OF DELHI, CANADA.

CAN-FILLING MACHINE.

SPECIFICATION forming part of Letters Patent No. 625,170, dated May 16, 1899.

Application filed December 3, 1898. Serial No. 698,215. (No model.)

*To all whom it may concern:*

Be it known that I, JAMES THOMAS KEARNS, superintendent, of the town of Delhi, in the county of Norfolk and Province of Ontario, Canada, have invented a certain new and Improved Machine for Filling Cans with Apples and Similar Fruit, of which the following is a specification.

The object of my invention is to devise a machine for filling cans with apples or other fruits and vegetables of a like nature; and it consists, essentially, of means for feeding the prepared fruit into the cans regularly in small quantities, combined with means for shaking down the fruit within the cans, and in such details of construction as are hereinafter more specifically described and then definitely claimed.

Figure 1:
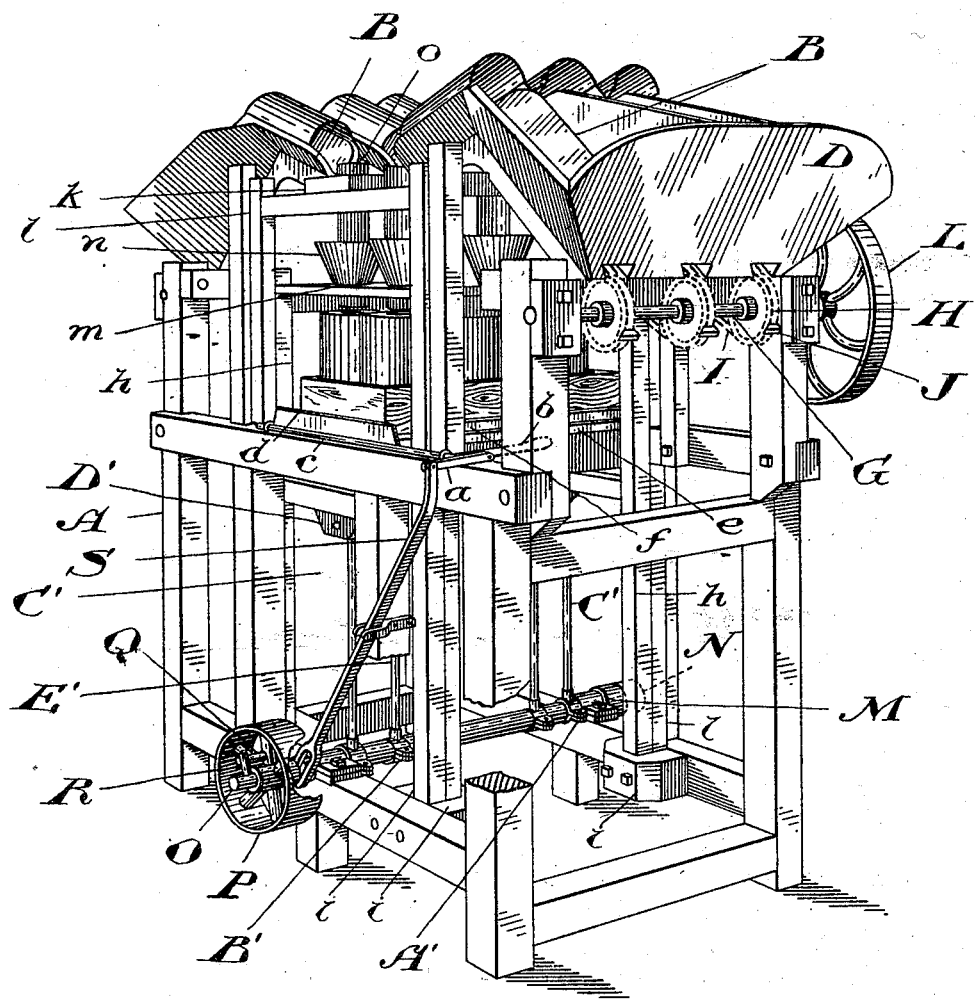
Figure 2:
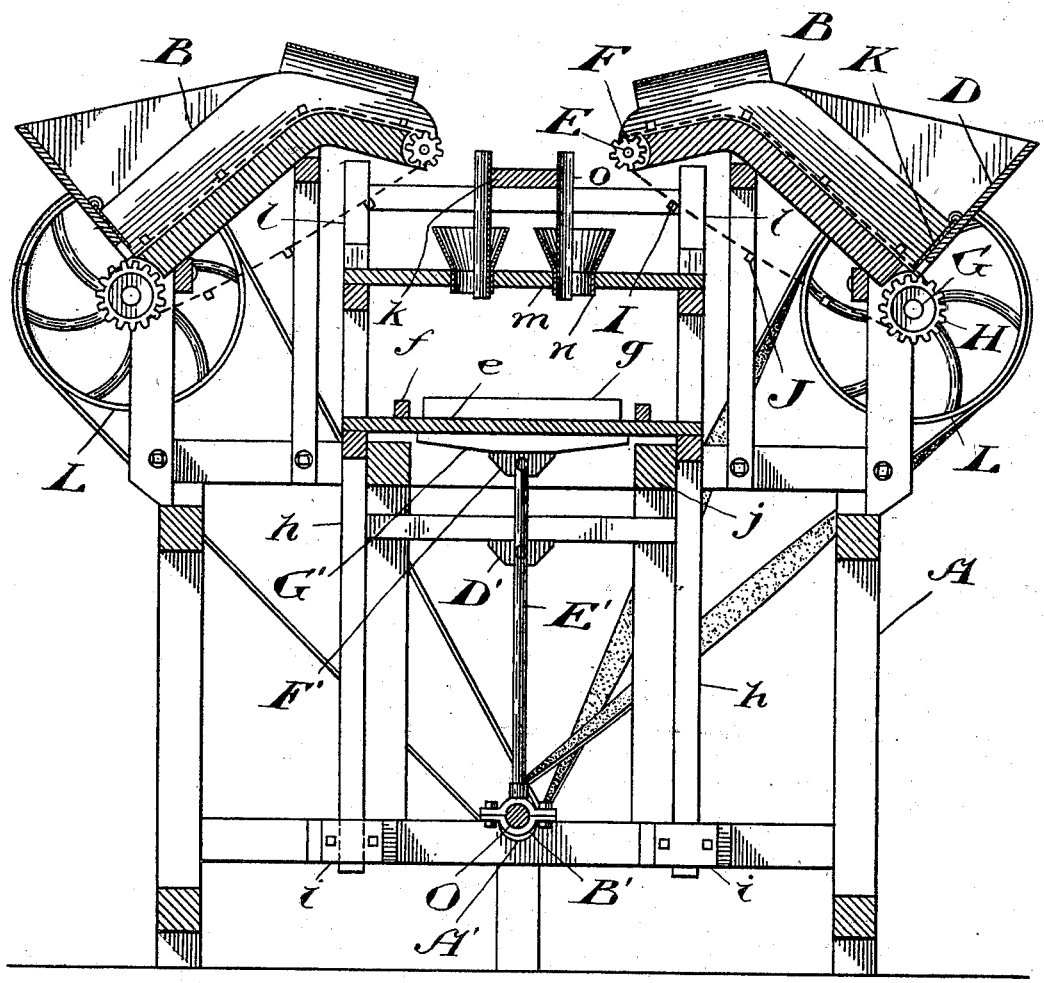

Figure 1 is a perspective view of my machine, partly broken away to expose the construction. Fig. 2 is a sectional front elevation of the same.

In the drawings like letters of reference indicate corresponding parts in both figures.

A is the frame of the machine, suitably constructed to support the different parts.

B are a series of feeding troughs or hoppers, preferably six in number, located three at each side of the machine. These feeding-troughs are preferably substantially V-shaped in cross-section, as indicated in Fig. 1. The outer end of each trough forms a reservoir or receptacle, in which is placed the fruit to be fed to the cans. This part of the trough is inclined upwardly toward the center of the machine, and thence the trough inclines in a downward direction toward the discharge end. The reservoir ends of each set of feeding-troughs are closed by the board D.

E is a shaft running from back to front of the machine in proximity to the discharge ends of the feeding-troughs at each side of the machine. Upon this shaft are secured three sprocket-wheels F, one for each feeding-trough.

G is a shaft located in proximity to the bottom of the feeding-troughs at the reservoir end at each side of the machine, and H are three sprocket-wheels fast thereon.

I are carrying-chains running one in the bottom of each feeding-trough and carried by the sprocket-wheels F and H.

J are the small wooden blocks or carriers which are secured to the chain. It will be noted that openings are formed in the board D for the passage of these chains and carriers. Hinged to the board D, at the reservoir end of each feeding-trough, is a flap K, the lower edge of which lies in the path of the carriers J, so that as each carrier passes it jars the flap, and thus shakes the fruit in the reservoir end of the trough down upon the carrying-chain, thus preventing any sticking or jamming.

Upon each of the shafts G is secured a pulley L, suitably driven by belts from the pulleys M and N upon the main driving-shaft O, suitably journaled at the lower portion of the frame of the machine. At the other end of this shaft is located a pulley P, loose upon the shaft and provided with a lug or projection Q, adapted to engage with the arm R on the end of the shaft when the pulley is moved into the proper position.

S is a shifter-arm centrally fulcrumed upon the frame of the machine. The lower end of this shifter-arm is forked to engage a grooved sleeve or hub formed upon the pulley P. Pivoted to the upper end of the shifter-arm is a link $a$, which is pivoted at its other end to the lever $b$. This lever projects from the spindle $c$, suitably journaled transversely upon the frame of the machine and provided with the flap $d$. When the lever $b$ is pulled forward to throw the pulley out of clutch with the shaft, the flap $d$ is dropped forward into a horizontal position. When the pulley is in clutch with the shaft, the flap is in the vertical position. (Shown in Fig. 1.) Behind the flap $d$ is the platform $e$, upon which the tray containing the cans to be filled is placed. The position of this tray is defined by the guides $f$ and the back-stop $g$. The platform $e$ is secured to the four uprights $h$, which are adapted to slide in the guides $i$, secured to the frame of the machine near the bottom. These uprights are connected together with suitable cross-bars. When at its lower point, the platform $e$ rests upon the upper cross-sills $j$ of the frame of the machine.

$m$ is a frame secured to the upright $h$ a suitable distance above the platform $e$. Inserted in the frame $m$ are a series of funnels $n$, located one below the discharge end of each of the feeding-troughs B.

$k$ is a frame located above the frame $m$ and suitably secured to the four uprights $l$, which slide in the guides $i$ behind the uprights $h$ and are secured together by suitable cross-bars. The upper sills $j$ also serve to retain the uprights $h$ and $l$ in position. Secured to the frame $k$ are a series of guides $o$, which extend down through the funnels $n$. These guides are preferably curved in cross-section, as shown, to fit within the funnels and serve the double purpose of guiding the fruit within the funnels and when reciprocated vertically of preventing any of the fruit sticking within the contracted part of the funnel.

Upon the shaft O are four eccentrics A' and B'. The upper ends of the eccentric-rods C' of the eccentrics A' are journaled in the bearings D' upon suitable cross-bars connecting the uprights $l$. The eccentric-rods E' of the eccentrics B' are journaled in suitable bearings F', formed upon the base-plate G', upon which the platform $e$ rests. The parts of the machine are so proportioned when the eccentric is in its lowest position that the whole weight of the platform $e$ and anything carried by it rests upon the sills $j$, thus relieving the eccentrics of jarring. The eccentrics A' B' are set to throw diametrically opposite one another, so that when the platform $e$ is raised the frame $k$ is lowered, and vice versa.

Having described the construction of my machine, I will briefly set out its mode of operation. A measured quantity of fruit is placed in the reservoir end of each feeding-trough. A tray containing six cans is then placed in position upon the platform $e$. The lever $b$ is then pushed down, throwing the driving-pulley into clutch with the shaft and raising the flap $d$, so that it becomes impossible to remove the tray of cans without first stopping the machine. By means of their driving connection with the main shaft the carrying-chains now begin to move, each carrier lifting one or two pieces of fruit up the inclined portion of the trough and down to the discharge end, whence the fruit drops into the funnels $n$, and thence into the cans located below them. At the same time the platform upon which the cans rest is rapidly being jarred up and down, thus shaking down the fruit very thoroughly and causing it to pack as closely as if inserted by hand. The guides $o$ are at the same time moving up and down through the funnels $n$, thus preventing any fruit clogging the funnels. As soon as all the fruit has been fed into the cans the lever $b$ is pulled forward, the machine stopped, and the flap $d$ lowered so that the tray of filled cans may be removed from the machine.

These cans may be of any size; but I find my machine particularly well adapted for filling what is known as "gallon-cans." I find the shape of the feeding-troughs to be an important factor in insuring the success of the machine. A short downward slope is necessary to insure a regular delivery to the funnels. At the same time, if the trough were made to slope downward for its whole length the feed would be altogether too rapid. I secure the combination of a sure feed and a regular and steady feed by giving the troughs the combination of the upslope and downslope, as seen more particularly in Fig. 2.

A second feature of great importance in the machine is the packing of the fruit by the jarring up and down of the cans in the process of filling. Other features which contribute to the working of the machine have been already described in the body of the specification. In practice modifications may be made of the means of driving the various parts, and I do not, therefore, wish to confine myself to the exact construction shown.

What I claim as my invention is—

1. In a machine for filling cans, a feeding trough or hopper having its bottom formed with two inclines, the lower incline being on an upward slope from the center of the hopper and the other incline being on a downward slope, in combination with a suitably-driven chain conveyer traveling around said inclined bottom and having the portion thereof inside the hopper conforming in shape to the said upward and downward inclines, substantially as and for the purpose specified.

2. In a machine for filling cans, the combination of a feeding-trough, a platform adapted to hold cans, a funnel interposed between said hopper and said platform, a guide suitably supported and coacting with said funnel, and means for vibrating one of said last-mentioned parts with respect to the other, substantially as described.

3. In a machine for filling cans, a feeding trough or hopper having an opening in its closed end, a suitably-driven chain conveyer adapted to run in the bottom of said trough or hopper and passing through said opening, and a flap hinged and extending down over the said opening so that it will be moved by the conveyers on the chain, substantially as described.

4. In a machine for filling cans with fruit, a feeding trough or hopper having its bottom shaped to form an upward slope from the reservoir end, and a downward slope to the discharge end, in combination with a suitably-driven chain conveyer adapted to run in the bottom of the trough; a platform for cans adapted to slide vertically in the frame of the machine; means for vibrating the said platform; a funnel located below the discharge end of the trough and so supported as to move with the platform; a frame adapted to slide vertically in the frame of the machine; a guide secured to the said frame and extending down through the funnel; and means for vibrating the said frame to cause the guide to reciprocate vertically within the funnel, substantially as and for the purpose specified.

5. In a machine for filling cans with fruit, a V-shaped feeding trough or hopper closed at the reservoir end and having its bottom shaped to form an upward slope from the reservoir end and a downward slope to the discharge end, in combination with a suitably-driven chain conveyer adapted to run in the bottom of the trough and passing through an opening in the closed end; and a flap hinged upon the inside of the end and extending down over the opening so that it will be moved by the conveyers upon the chain, substantially as and for the purpose specified.

6. In a machine for filling cans with fruit, a feeding trough or hopper arranged to hold fruit and discharge it from its discharge end, in combination with a platform for cans adapted to slide vertically in the frame of the machine; means for vibrating the said platform; a funnel located below the discharge end of the trough and so supported as to move with the platform; a frame adapted to slide vertically in the frame of the machine; a guide secured to the said frame and extending down through the funnel; and means for vibrating the said frame to cause the guide to reciprocate vertically within the funnel, substantially as and for the purpose specified.

7. In a machine for filling cans with fruit, a platform for cans, in combination with a flap hinged upon the frame of the machine in front of one edge of the platform; a driving-shaft; a pulley loose upon the shaft; clutch mechanism for making a driving connection between the shaft and the pulley; and clutch-shifting mechanism connecting the clutch mechanism and the aforesaid flap so that when the flap is raised the machine is in clutch, and when the flap is dropped the machine is out of clutch, substantially as and for the purpose specified.

Delhi, November 26, 1898.

JAMES THOMAS KEARNS.

In presence of—
 DAISY LA FORTUNE,
 CHAS. G. WOOD.